Sept. 28, 1937.  M. E. McLEAN  2,094,461
OUTPUT SYSTEM FOR GAS PRODUCING APPARATUS
Original Filed March 30, 1936
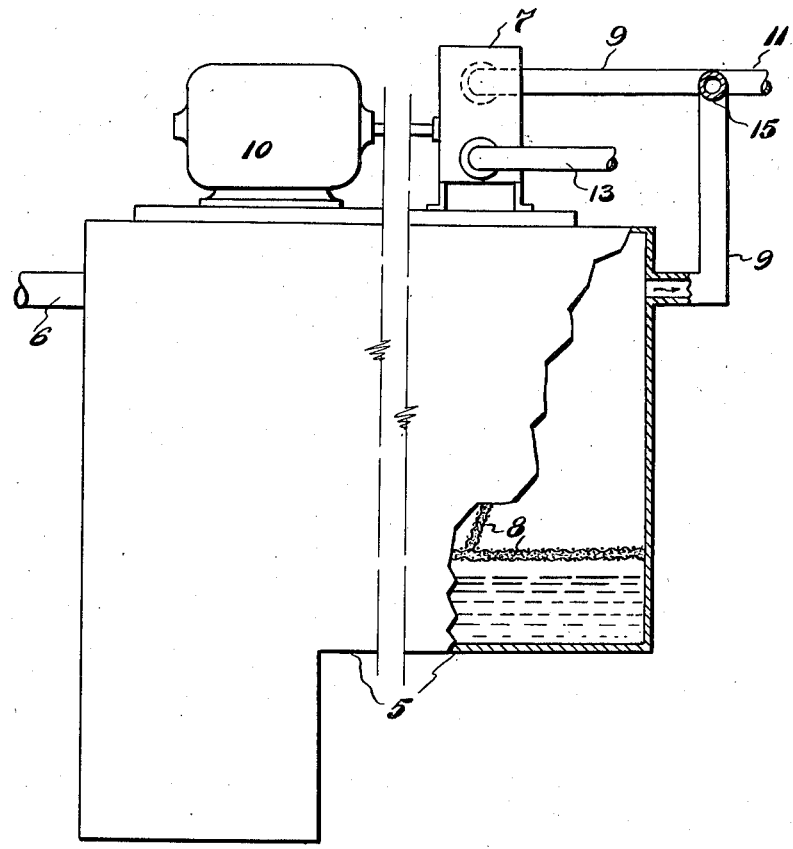
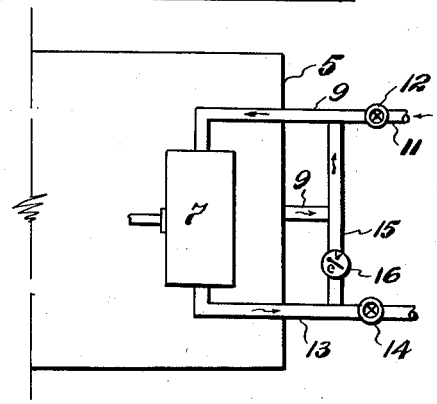
Inventor
Malcolm Edward McLean
By Frederick C. Bromley
Attorney.

Patented Sept. 28, 1937

2,094,461

UNITED STATES PATENT OFFICE 2,094,461

OUTPUT SYSTEM FOR GAS PRODUCING APPARATUS

Malcolm Edwards McLean, Nelson Township, Ontario, Canada, assignor of one-tenth to Andrew Leonard Laing, York, Ontario, Canada Original application March 30, 1936, Serial No. 71,551. Divided and this application December 14, 1936, Serial No. 115,764. In Canada March 28, 1936

1 Claim. (Cl. 261—30)

The invention relates to improvements in systems employed to control or regulate the mixture output of a gas producing apparatus as described in the present specification and illustrated in the accompanying drawing forming part thereof.

The invention particularly concerns a "Gas producing apparatus" of the nature disclosed in my copending application Serial No. 71,551, filed March 30th, 1936, of which this application is a division, in which air is drawn by a pump or exhauster through a carbureting chamber and therein commingled with vaporized oil to compose a gaseous mixture.

The object of the present invention is to provide a system of pipes and valves so co-ordinated with the outlet and the pump as to control or regulate the mixture whereby it may be attenuated to a desired degree in addition to obviating back-pressure.

Referring to the accompanying drawing:

Figure 1 is a side elevation of the invention together with the carburetor chamber which is shown partly in section.

Figure 2 is a detail plan showing the system of pipes and valves.

The gas producing apparatus as exemplified in the drawing by way of illustration but not of limitation, comprises a carbureting chamber 5 into which air is drawn through an inlet 6 by means of a suction pump or exhauster 7. The chamber is equipped with suitable carbureting agents as at 8 and the carbureted air is drawn off through an outlet pipe or duct 9 by the pump, which is driven by the motor 10.

In carrying out the invention, the duct 9 is provided with an auxiliary air-admission connection 11 controlled by a valve 12. This connection functions to admit extraneous air into the mixture for the purpose of attenuating it.

The discharge pipe or duct of the pump is denoted at 13. This duct is controlled by a valve 14. In advance of the valves 12 and 14, the inlet duct 9 and the outlet duct 13 are connected by a by-pass 15 having a check valve 16.

The by-pass operates to obviate back-pressure in the discharge duct by diverting gases to the inlet duct for recirculation.

It will be readily understood that by this system of control, the richness of the output can be varied by means of the supplemental air-control connection and that detrimental back-pressure is overcome by the by-pass connection.

What I claim is:—

The combination with a carbureting apparatus having a gas outlet, of a motor driven exhauster, a duct connecting the outlet to the exhauster, a valve-controlled auxiliary air inlet therefor, a discharge duct for the exhauster, and a valve controlled by-pass connecting the discharge duct to said first round duct in advance of the auxiliary air inlet.

MALCOLM EDWARDS McLEAN.